US009081967B2

(12) United States Patent
Pavlyushchik (10) Patent No.: US 9,081,967 B2
(45) Date of Patent: Jul. 14, 2015

(54) SYSTEM AND METHOD FOR PROTECTING COMPUTERS FROM SOFTWARE VULNERABILITIES (71) Applicant: Kaspersky Lab ZAO, Moscow (RU)

(72) Inventor: Mikhail A. Pavlyushchik, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 14/077,104

(22) Filed: Nov. 11, 2013

(65) Prior Publication Data
US 2015/0047046 A1 Feb. 12, 2015

(30) Foreign Application Priority Data

Aug. 7, 2013 (RU) ................................ 2013136976

(51) Int. Cl.
H04L 29/06 (2006.01)
G06F 21/57 (2013.01)
G06F 21/52 (2013.01)
G06F 21/12 (2013.01)

(52) U.S. Cl.
CPC ............ *G06F 21/577* (2013.01); *G06F 21/121* (2013.01); *G06F 21/52* (2013.01); *H04L 63/1433* (2013.01)

(58) Field of Classification Search
CPC ....... G06F 21/121; G06F 21/53; G06F 21/54; H04L 63/1433
USPC .......................................................... 726/25
See application file for complete search history.

(56) References Cited

U.S. PATENT DOCUMENTS

| 7,523,308 | B2 | 4/2009 | Dadhia et al. |
| 7,530,106 | B1 * | 5/2009 | Zaitsev et al. ................... 726/24 |
| 8,239,915 | B1 * | 8/2012 | Satish et al. ...................... 726/1 |
| 8,332,909 | B2 * | 12/2012 | Chatterjee et al. ................ 726/1 |
| 8,468,605 | B2 | 6/2013 | Haviv et al. |
| 2005/0188419 | A1 | 8/2005 | Dadhia et al. |
| 2007/0143851 | A1 | 6/2007 | Nicodemus et al. |
| 2008/0163382 | A1 * | 7/2008 | Blue et al. ....................... 726/28 |
| 2009/0038015 | A1 | 2/2009 | Diamant et al. |

(Continued)

FOREIGN PATENT DOCUMENTS

WO 2005121953 A1 12/2005

OTHER PUBLICATIONS

EPO Extended Search Report from counterpart EP Application No. 13 195026.3-1956.
Animesh Patcha et al, "An Overview of Anomaly Detection Techniques: Existing Solutions and Latest Technological Trends", Computer Networks, vol. 51, No. 12 Aug. 1, 2007.

(Continued)

Primary Examiner — Longbit Chai
(74) Attorney, Agent, or Firm — Arent Fox LLP; Michael Fainberg (57) ABSTRACT Disclosed herein are systems, methods and computer program products for protecting computer systems from software vulnerabilities. In one aspect, a system is configured to detect execution of a software application and determine whether the detected application has vulnerabilities. When the application has vulnerabilities, the system may analyze the application to identify typical actions performed by the application. The system may then create one or more restriction rules based on the identified typical actions of the application. The restriction rules allow application to perform typical actions and block atypical actions. The system then controls execution of the application using the created restriction rules.

19 Claims, 5 Drawing Sheets

(56) References Cited

U.S. PATENT DOCUMENTS

2013/0074188 A1    3/2013    Giakouminakis et al.
2013/0198848 A1    8/2013    Wolff

OTHER PUBLICATIONS

Peter Szor "The Art of Computer virus Research and Defense" Symantec Press, XP002718648, ISBN: 0321304543 Section 13.2.11 Security Updates Feb. 13, 2005.

* cited by examiner

SYSTEM AND METHOD FOR PROTECTING COMPUTERS FROM SOFTWARE VULNERABILITIES

CROSS-REFERENCE TO RELATED APPLICATIONS

This application claims benefit of priority under 35 U.S.C. 119(a)-(d) to a Russian Application No 2013136976 filed on Aug. 7, 2013, which is incorporated by reference herein.

FIELD OF TECHNOLOGY

The disclosure relates generally to the field of information security, and more specifically to systems, methods and computer program products for protecting computer systems from software applications containing vulnerabilities.

BACKGROUND

Software vulnerabilities are often exploited to attack user computers or steal personal data. The term "vulnerability" characterizes a particular defect or shortcoming in the software that can be utilized by a hacker for illegal purposes. As a rule, a vulnerability arises as a result of some error in the software. Vulnerabilities may be found in the majority of popular applications and operating systems. In order to exploit a vulnerability of a particular application, the hacker must have special software that utilizes the vulnerabilities in the applications. Such software is commonly referred to as an "exploit". An exploit is a malicious code that conventionally consists of two parts. The first part of the exploit code makes it possible to utilize a specific vulnerability in a particular application in order to make it possible to utilize the second part of the exploit code, which is generally known as the "payload". This "payload" makes it possible for the hacker to perform certain unlawful actions. An example of unlawful actions are those actions aimed at breaching the integrity of the operations of an application and actions making it possible to increase the level of privileges of the hacker in the operating system. These unlawful actions allow the hacker to obtain the information he needs about the users of the particular computer, such as confidential information.

The developers of software and the administrators of computer networks devote great efforts to discovering and then correcting vulnerabilities in applications. However, due to the complexity of modern software, it is almost impossible to find absolutely all vulnerabilities. Therefore, in the event of discovering a vulnerability in software, the software developers strive to correct the discovered vulnerability as soon as possible. For this, application developers create an update for the particular application that eliminates the vulnerability found in the application. But it takes time to create and then send out the update for the application that eliminates the vulnerability found in the application, which can be utilized by hackers in the event they should find such a vulnerability. Moreover, even if an update is provided to the users for vulnerable applications, the users might not install the updates for a very long time, e.g., months or even years. There may be various reasons for this, such as the fact that the vulnerable applications after being updated might have unstable working or be incompatible with other applications, which is especially critical to servers. Yet another reason might be negligence on the part of the users, who often do not install updates for applications at all.

Moreover, after creating an update for an application the providers of software or antivirus services may issue a security bulletin which might contain information about the application containing the vulnerability, such as the threat level and urgency of the problem, the likelihood of the presence of the exploit for the particular vulnerability, and the potential harm. Furthermore, the security bulletin may contain the necessary instructions to repair the particular application, such as information about the updating of the application and its whereabouts for downloading. Thus, on the one hand the security bulletin helps to more quickly update the vulnerable applications for the users and, consequently, remove the vulnerabilities found in the application. On the other hand, these same security bulletins can also be utilized by hackers to create an exploit and subsequently use it for their own gain. This is due to the fact that, as explained above, it takes time for the majority of users and administrators to install the update and in some instances the users neglecting to update the vulnerable application. Thus, for example, the administrator of a corporate network or directly a computer system where the vulnerable application is installed will not necessarily apply the issued corrections at once, since the administrator must first perform a test to check the issued update containing the repair of the application with regard to the vulnerability found, for correctness of the subsequent operation of the application and for possible harm caused to the network or the computer system by the repaired application. Hence, once again it takes time to implement and repair an application containing a vulnerability.

Also, in certain cases, yet another factor of delay in the installing of an update to remove a vulnerability in an application is the lack of any notification, whether of the administrator of the network or system or of the vulnerable applications themselves as to the release of the new update repairing the vulnerability in the application.

Thus, there is a need to solve the problem of protecting a corporate network or computer systems against exploitation of vulnerabilities in software applications deployed thereon, particularly during the time interval between discovery of a vulnerability of a software application and until the vulnerability is corrected.

SUMMARY

Disclosed herein are systems, methods and computer program products for protecting computer systems from software vulnerabilities, in one aspect, a system is configured to detect execution of a software application and determine whether the detected application has vulnerabilities. In one aspect, to determine whether the detected application has one or more vulnerabilities, the system may determine whether the application belongs to a category of applications that have one or more known vulnerabilities. When the application has vulnerabilities, the system may analyze the application to identify typical actions performed by the application. The system may then create one or more restriction rules based on the identified typical actions of the application. The restriction rules allow application to perform typical actions and block atypical actions. The system then controls execution of the application using the created restriction rules.

In another aspect, to identify typical actions performed by the application, the system may receive information about a first plurality of actions of the application from one or more of a database of a developer of the application, a database of an antivirus company, and one or more user computers running the application. In another aspect, the system may emulate the application in a virtual environment in order to identify a second plurality of actions performed by the application during its execution in the virtual environment. In yet another aspect, the system may receive information about a plurality of anomalous actions of the application, including actions performed by a known exploit that utilize a vulnerability of the application. In another aspect, the system may combine and analyze the information about at least one of the first and second plurality of actions with and the information about the plurality of anomalous actions to identify typical actions performed by the application.

In another aspect, to create restriction rules based on the identified typical actions, the system may determine a danger level of the identified vulnerabilities of the application and create additional restriction rules based on the danger level of the vulnerability.

In another aspect, when the application has at least one vulnerability, the system may check for application updates or security patches that eliminate the identified vulnerability and install identified application updates or security patches to eliminate the vulnerability. In another aspect, when one or more application update or security patches are installed, the system may remove or modify restriction rules associated with the eliminated vulnerability.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Example aspects of the present invention are described herein in the context of system, method and computer program product for protecting computer systems from software vulnerabilities. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
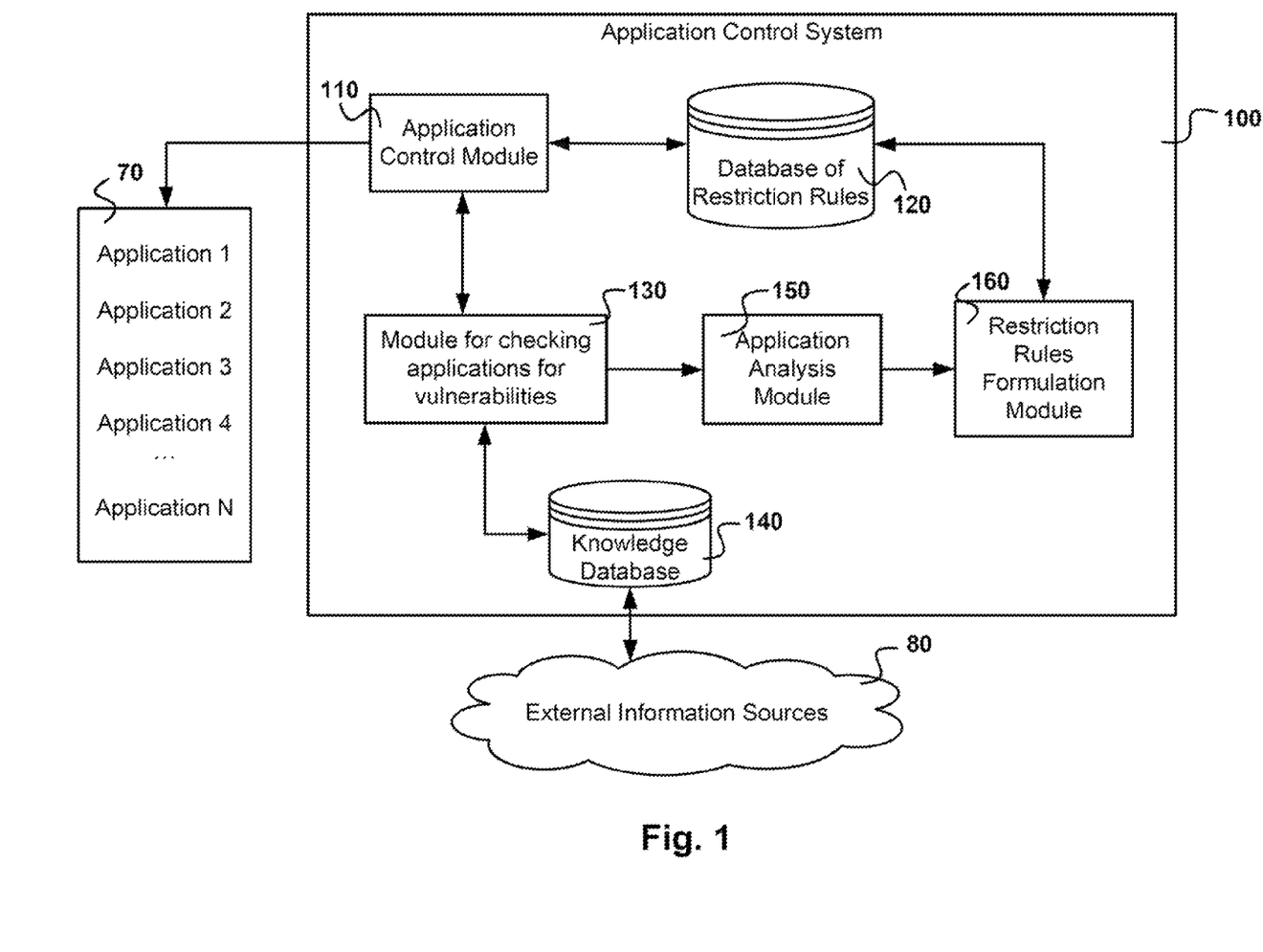
FIG. 1 is a diagram illustrating an example configuration of a system for controlling execution of applications containing vulnerabilities in accordance with aspects of the invention.

FIG. 1 shows an example system for control of applications containing vulnerabilities. The application control system 100, in one aspect, relates to so-called "application control" systems. "Application control" systems are designed to control applications 70 by means of a list of application control rules, which enable control an application 70 or groups of applications 70 by restricting actions that may be performed in the process of executing these applications. It should be noted that there may be various reasons for controlling applications. One reason is to protect computer systems against attacks through applications containing vulnerabilities. Therefore, with this purpose, the application control system 100 (hereinafter, the system 100) checks the applications 70 to see if they contain at least one vulnerability and formulates application control rules in the event of finding at least one vulnerability in the application. It should be noted that the application control system 100 may monitor applications containing either known or unknown vulnerabilities. To that end, in one aspect, the application control system 100 includes an application control module 110, a restriction rule database 120, a module for checking an application for presence of vulnerabilities 130, a knowledge database 140, which contains at least some information on the applications and their vulnerabilities, an application analysis module 150, and a restriction rule formulation module 160.

In one aspect, the application control module 110 is configured to control applications containing at least one vulnerability by means of restriction rules stored in the restriction rule database 120, and to send each application 70 being initialized and not controlled by corresponding restriction rules from the restriction rule database 120 to the module for checking an application for vulnerabilities 130. The restriction rules allow system 100 to block actions not conforming to the typical actions of the application 70 being controlled. The term "typical actions", as used herein, meant such actions that are performed by the application when executing the commands and instructions established during its creation by the manufacturer of the given application and that are directed at executing a task corresponding to the given application. For example, for Adobe Acrobat® application, the following are some of the typical actions, including: the action "open file" and the action "save file", whereas the action "save executable file to disk" or actions directed at "start process from executable file" are not typical actions for this application (hereinafter "atypical actions"). In one aspect, when an atypical action is identified for an application being controlled, the application control module 110 can completely terminate execution of the application 70 being controlled or partially limit the execution of the application 70, such as, for example, block only access to the corporate network or the Internet, which will be described in detail in FIG. 2.

In one aspect, the module for checking an application for vulnerabilities 130 (hereinafter, the checking module 130) checks the received application 70 for the presence of vulnerabilities. The check is based on determining whether the checked application 70 belongs to the category of applications containing vulnerabilities specified in the knowledge database 140. The knowledge database 140 stores information about all applications containing at least one know vulnerability and provides this information to the checking module 130 upon request. It should be noted that the information stored in the knowledge database 140 may be periodically updated with new information received from an external information sources 80, such as antivirus databases of an antivirus company, databases of companies specializing in the identification of new vulnerabilities of applications, or databases of providers of the software applications. Furthermore, in one aspect, the knowledge database 140 may be located remotely from the other modules of the application control system 100, for example, on a remote antivirus server. Thus, during the vulnerability check, the checking module 130 determines whether the checked application 70 belongs to the category of vulnerable applications or not. If the application does not belong to the category of vulnerable applications, e.g., no vulnerability was found for this application in the knowledge database 140, the analysis of the application for presence of vulnerabilities ends, and the application will be allowed to execute. Otherwise, if it is determined that the checked application belongs to the category of vulnerable applications, e.g., at least one vulnerability was found in the application, the application may be sent to application analysis module 150 for further analysis.

In one example aspect, upon restarting of an application, which successfully undergone an initial vulnerability analysis (i.e., no vulnerability was found in the application), the checking module 130 may perform another check of the application for the presence of newly appeared vulnerabilities. If at least one new vulnerability is identified in the application, the checking module 130 may send this application to the application analysis module 150.

In yet another aspect, after finding at least one vulnerability in the application 78 the checking module 130 may search in the knowledge database 140 for a released application update, which eliminates the corresponding vulnerability in the application. These updated may be provided to the database 140 from external information sources 50 on a periodic basis. After finding the appropriate updates for the applications containing vulnerabilities, the system 100 may automatically install or propose that the user installs these updates. Once updates are installed, the system 100 may modify (e.g., weaken) or completely eliminate the corresponding restriction rules for that application. It should be noted that the elimination of the restriction rules of the application will be performed only if there are no known vulnerabilities in the application. Weakening of the restriction rules of applications is possible if the remaining vulnerabilities in the application do not correspond to a critical danger level (the definition of the danger level of a vulnerability will be discussed with referenced to FIG. 2).

In one example aspect, the application analysis module 150 analyzes an application and creates a list of typical actions for that application. The ways of creating a list of typical actions will be discussed with reference to FIG. 2 below. As mentioned above, the typical actions of an application include the actions which are performed by the application when executing commands and instructions established during its creation by the developer of the given application, and which are directed to executing tasks associated with the given application. After creating the list of typical actions for a particular application, the application analysis module 150 sends this list of typical actions to the restriction rule formulation module 160.

In one example aspect, the restriction rule formulation module 160 is configured to create at least one application restriction rule on the basis of the list of typical actions received from the application analysis module 150. The restriction rules are created such that, during the execution of the associated application, these restriction rules only permit the performance of actions from the list of typical actions for the particular application, and all other atypical actions are blocked. Thus, for example, for the "MS Word" application, restriction rules may block all actions not found on a previously created list of typical actions. Afterwards, during the execution of this application, it was found that the application was trying to save an executable file, such as one in PE-format, and since this action does not conform to the list of typical actions, this action will consequently be blocked by the application control module 110. The restriction rule formulation module 160 then sends all created restriction rules to the restriction rule database 120 for subsequent use by the application control module 110.

In one example aspect, the application control module 110 may be configured to exercise the control of vulnerable applications only among the most popular applications, such as, for example, the top 50 most popular applications, while other applications are let through. This is due to the fact that the most popular applications are the most likely targets of vulnerability attacks. In this case, during the checking of the application for presence of vulnerabilities, the checking module 130 may also perform a preliminary analysis of the popularity of the application. For this, the knowledge database 140 may also store a table of ratings of the popularity of different applications, which will be updated from external information sources 80. It should be noted that in this case the external information sources 80 are not restricted to the previously listed examples of information sources.

In one example aspect, a rating of popularity of applications can be based on calculating the frequency of starts of applications. Thus, one of the external sources 80, such as an antivirus server, may collect information from different PCs, notebooks, mobile devices of users of the network about number of starts of all applications installed on them. The antivirus server 80 then distributes the information obtained with respect to the applications and adds up the number of starts of each application. After this, the antivirus server 80 formulates a popularity rating for each application and sends this rating to the knowledge database 140.

Figure 2:
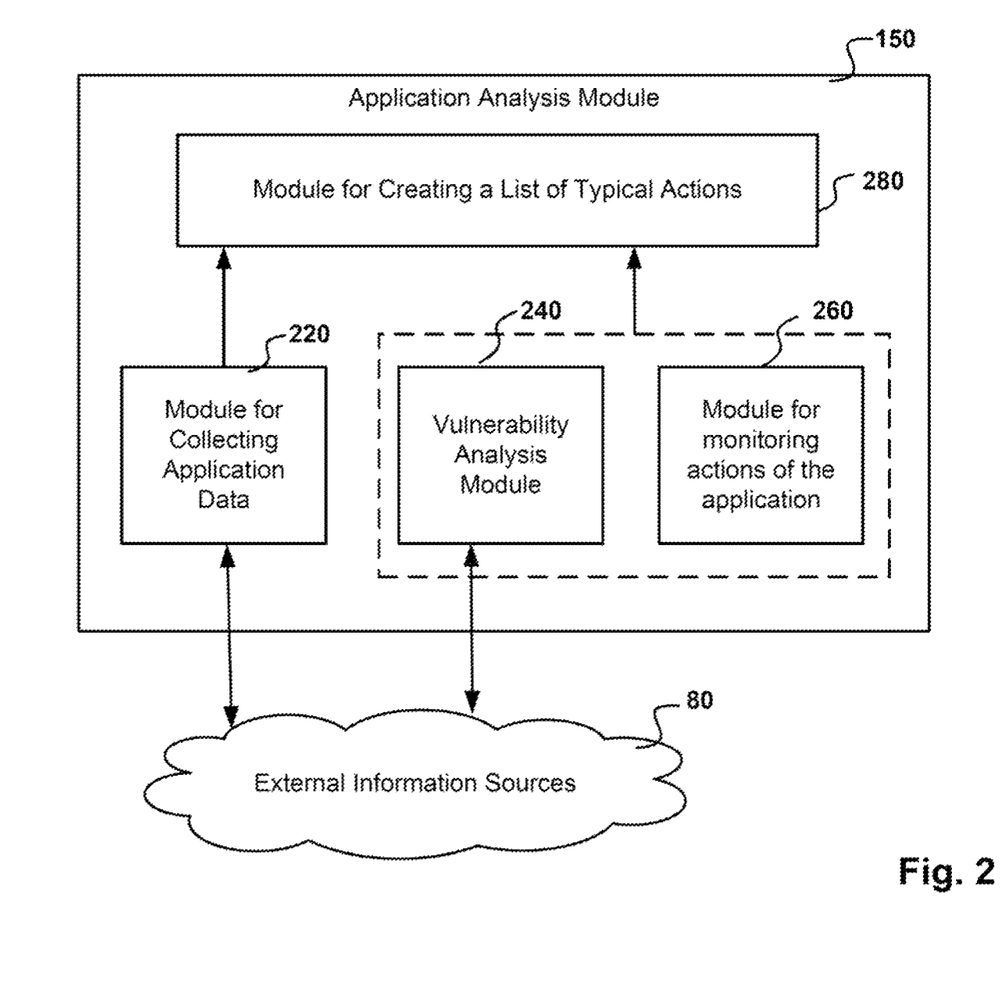
FIG. 2 is a diagram illustrating an example configuration of an application analysis module of the application control system in accordance with aspects of the invention.

In another example aspect, the application analysis module 150 with the assistance of a module for collecting application data 220, which is described in detail FIG. 2, may periodically update the information about the typical actions of previously analyzed applications containing vulnerabilities from external sources. Hence) the module 160 on the basis of the updated information about the typical actions of the applications will correct the previously created restriction rules (or formulate new or additional restriction rules) for these applications.

FIG. 2 shows an example configuration of the application analysis module 150. In one aspect, the application analysis module 150 comprises a module for collecting application data 220 (hereinafter, the collection module 220), the vulnerability analysis module 240, the module for monitoring and controlling actions of the application 260 and module for creating a list of typical actions 280 on the basis of analysis of the provided data (hereinafter, the module 280).

In one aspect, the collection module 220 is configured to collect information about the operation of applications, and specifically, data about the actions being performed by an application during its operation. The information collection may be performed, for example) by querying external information sources 80. The external information sources 80 can include not only example databases identified in the description of FIG. 1 above, but also other information sources, such as personal computers (PCs) of the users on which the given application is being used. After this, the collection module 220 sends the collected information to the module 280 for subsequent analysis. In one aspect, information about the actions of the application can be collected in advance and compiled on one of the external information sources 80, such as a remote antivirus server. The collection module 220 may then only consult said remote antivirus server. The collection module 220 may periodic query the external information sources 80 for the presence of new information about typical actions of various applications.

In one example aspect, the vulnerability analysis module 240 is configured to collect information about vulnerabilities identified in the analyzed application and then form a list of anomalous actions and present this list to the module 280. The vulnerability information may include, but not limited to: information about the metadata of the application, such as which part of the application contains the vulnerability or at which memory offset in the code is the vulnerability located; information on existing exploits utilizing this vulnerability; information on network ports and protocols used by the exploit; information on the level of danger of the vulnerability; information on the presence of an update removing this vulnerability, and the time of detection of this vulnerability. This information may also be collected by querying external information sources 80. On the basis of the collected information about application vulnerabilities, the list of anomalous actions is produced. Anomalous actions are actions performed during the utilization of the vulnerability of the application by the known exploit.

In one example aspect, the module 260 is configured to monitor execution of the application, collect information about actions performed by the application, and transmit the collected information to the module 280. In one aspect, the module 260 may be implemented as an observation system, such as an emulator, which identifies all actions performed during the execution of the application. For example, the application may be emulate in a virtual environment (e.g., a sandbox) provided by module 260 to identify typical actions performed by the application during its execution. The information about identified actions may be sent to the module 280 in the form of a list of actions performed. If the module 260 is implemented as an emulator, then it may perform the following operations to identify all actions: (1) during the execution of the application, compile a journal of events, such as system calls, and (2) analyze the journal of events and compile a list of actions performed, which may be separated into categories. For example, the actions may be separated into the following categories: file operations, network operations, writing to a register, inter-processor communications, etc.

In one example aspect, the module 280 is configured to compile a list of typical actions on the basis of an analysis of the information provided by the modules 220, 240 and 260. In one aspect, it may be sufficient to have information from at least the collection module 220 or from the modules 240 and 260 to create a list of typical actions. But for a more accurate list of typical actions, information from all three modules may be used in one example aspect.

The process of creating a list of typical actions may include three stages. In the first stage, the module 280 may perform an analysis of the information provided by the collection module 220. The analysis consists in identifying typical actions among all the actions that occurred during the execution of the application on different external information sources 80. As noted above, the information sources 80 may include third-party databases containing information about typical actions, such as those from companies producing the applications, as well as at least one user's PC, providing information about the actions performed during the execution of applications 70. Examples of the identification of typical actions in this case are:

Example 1

The actions will be typical actions if they are identified from all the information sources 70. But if an action was not discovered from all information sources, then that action is not added to the list of typical actions.

Example 2

Before identifying a typical action, a decision may be made that a typical action will only be that action that was provided by at least one user's PC and that was performed during the user's working with the given application.

In one example aspect, the module 280 may be also configured to identify anomalous actions from the information provided by the module 220. For example, if an action was identified in only 25% or less of the information sources (i.e., it is a rare action), and also an exploit has been identified that uses this action, then the action will be anomalous.

In the second stage, the module 280 compares lists of actions provided by modules 240 and 260. Since module 240 provides a list of anomalous actions, and module 260 provides a list of all actions performed by the application, the module 280 may remove from the list of all actions performed (from the module 260) the actions found in the list of anomalous actions (from module 240). Thus, the module 280 compiles a list of typical actions of the application.

In the third stage, the module 280 may compare the lists of typical actions compiled in stages one and two. After this, a definitive list of typical actions is compiled from the actions found on both lists. It should be noted that the module 280 may utilize stages one (analysis of information obtained from the collection module 220) and two (analysis of information obtained from modules 240 and 260) either jointly or by excluding one of them.

In one example aspect, the application analysis module 150 may also determine, besides the list of typical actions, the danger level of each known vulnerability of the application being analyzed. Depending on the danger level of the vulnerability, the module 150 may transmit to the restriction rule formulation module 160 information on creating additional restriction rules addressed to a partial restriction of the performance of the actions of the corresponding application. In one example aspect, the danger level of the vulnerability may be determined in accordance with the method of determination of danger level provided by the company Microsoft, as described at the address http://technet.microsoft.com/ru-ru/security/dn144685.aspx and presented in Table 1 below.

TABLE 1

| Danger Level | Definition |
| --- | --- |
| Critical | A vulnerability whose utilization makes possible the propagation of an Internet worm without intervention of the user. |
| Significant | A vulnerability whose utilization may endanger confidential information, the integrity or accessibility of user data or processing resources. |
| Moderate | A vulnerability whose utilization is substantially restrained by such factors as standard configuration, audit, or difficulty of use. |
| Low | A vulnerability which is extremely complicated to utilize or whose influence is minimal. |

As noted above, depending on the assigned danger level, the module 150 may send to the restriction rule formulation module 160 an appropriate request to create additional restriction rules, if the danger level is equal to the critical or significant level, a request to create additional restriction rules may be sent to the module 160. Otherwise, if the danger level is equal to the moderate or low level, no request to create additional restriction rules will be sent to the module 160. Furthermore, the request to create additional restriction rules may contain information on the specific vulnerability of the application that was identified and that needs additional restrictions. On the basis of the information about the vulnerability, the module 160 may formulate additional restriction rules for the application. Examples of additional restriction rules are the following: a restriction rule aimed at blocking those actions which are performed during the execution of the vulnerability for example, the rule will ban the performing of actions related to working on the Internet or the downloading of a file, i.e., a partial restriction of the application's function); a restriction rule that blocks all actions of the application in the event of the absence of any protected environment (thus, the application will work only in a protected environment, such as a sandbox); an existing restriction rule that has been corrected, which additionally creates a request for the user, which in turn asks for permission to allow the performance of a specific action or initialize the application.

Figure 3:
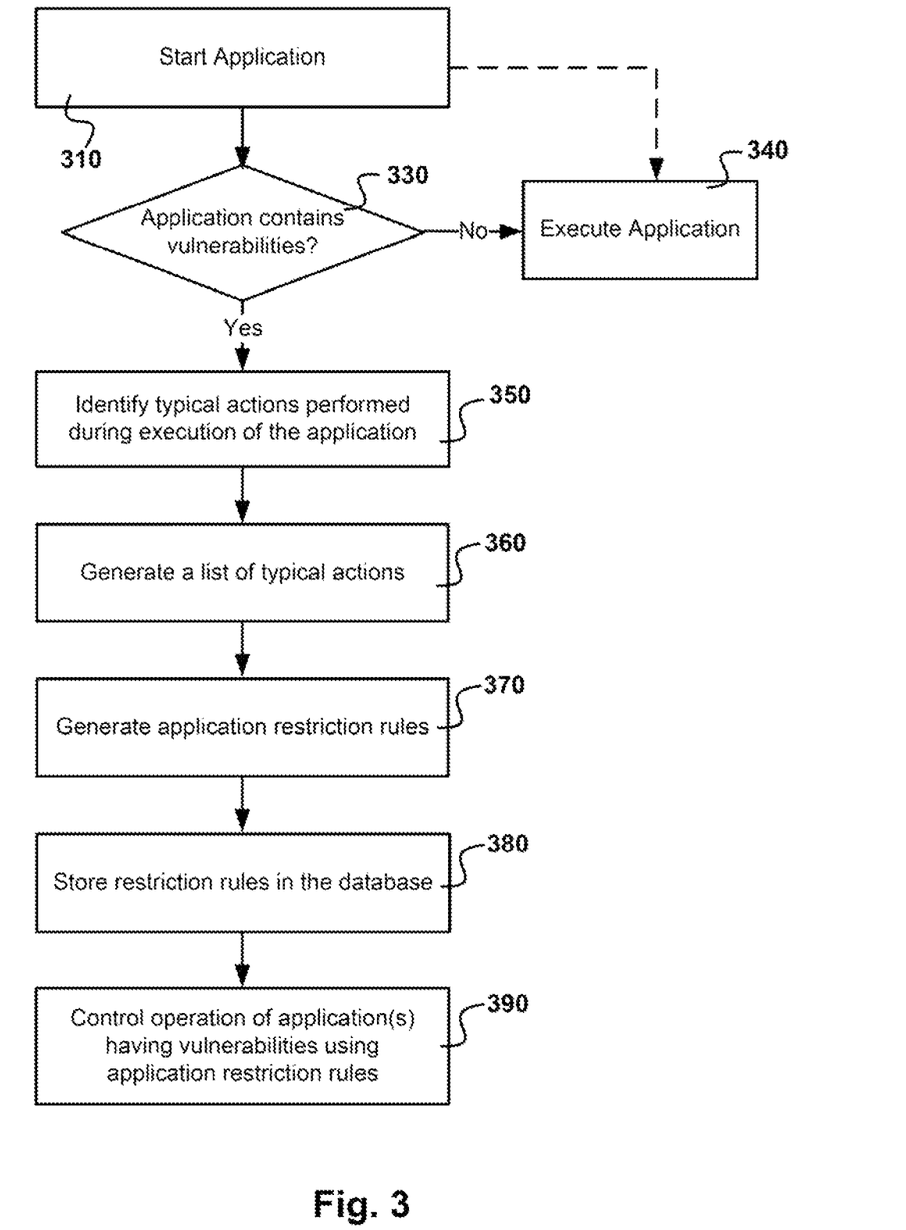
FIG. 3 is a flow diagram illustrating an example methodology for controlling execution of applications containing vulnerabilities in accordance with aspects of the invention.

FIG. 3 illustrates an example method for controlling execution of an application containing vulnerabilities. In step 310 the application control module 110 identifies the launch of each application 70. In step 330, the checking module 130 determines that the application 70 being launched belongs to the category of vulnerable applications. It should be noted that applications containing at least one vulnerability may be assigned to the category of vulnerable applications. The checking module 130 may determine whether the application 70 belongs to the category of vulnerable applications by querying the knowledge database 140, which contains information about vulnerable applications. If the application 70 does not contain a single vulnerability, the checking module 130 reports this to the application control module 110, which in turn carries out the execution of the application 70 in step 340. If the application 70 contains at least one vulnerability, then the checking module 130 sends the application to the application analysis module 150. In step 350, the application analysis module 150 performs an analysis of the application 70 in order to identify typical actions being performed by the application 70. Different mechanisms disclosed herein may be used to identifying typical actions. Next, in step 360, the application analysis module 150 compiles a list of typical actions of the application 70 and sends this list to the restriction rule formulation module 160. In step 370, the restriction rule formulation module 160 creates at least one restriction rule for the control of the application 70 based of the list of typical actions. For example, the restriction rules provide that the corresponding application is permitted to perform only actions from the created list of typical actions, and all other actions are blocked. In step 380, the restriction rule formulation module 160 adds all restriction rules created for the application 70 to the restriction rule database 120. Then, in the final step 390, application control module 110 allows the execution of the application 70 and will exercise control over the execution of the application 70 by means of the created application restriction rules.

In one example aspect, the application control module 110 may control only popular applications containing vulnerabilities. This is due to the fact that the most popular applications are the most likely targets for attacks by means of vulnerabilities.

In yet another aspect, following step 310, the application control module 110 may first determine whether the application 70 is controlled by any restriction rule from the restriction rule database 120. If the application 70 is be controlled by at least one restriction rule from the database 120, then the application control module 110 may permit the launching of the application 70, applying at least one identified restriction rule for the control of the application 70 and this application will be executed in step 340. Otherwise, if no restriction rule is found in the restriction rule database 120, the launch of the application is halted, and the application 70 may be sent to the checking module 130 in step 350.

Figure 4:
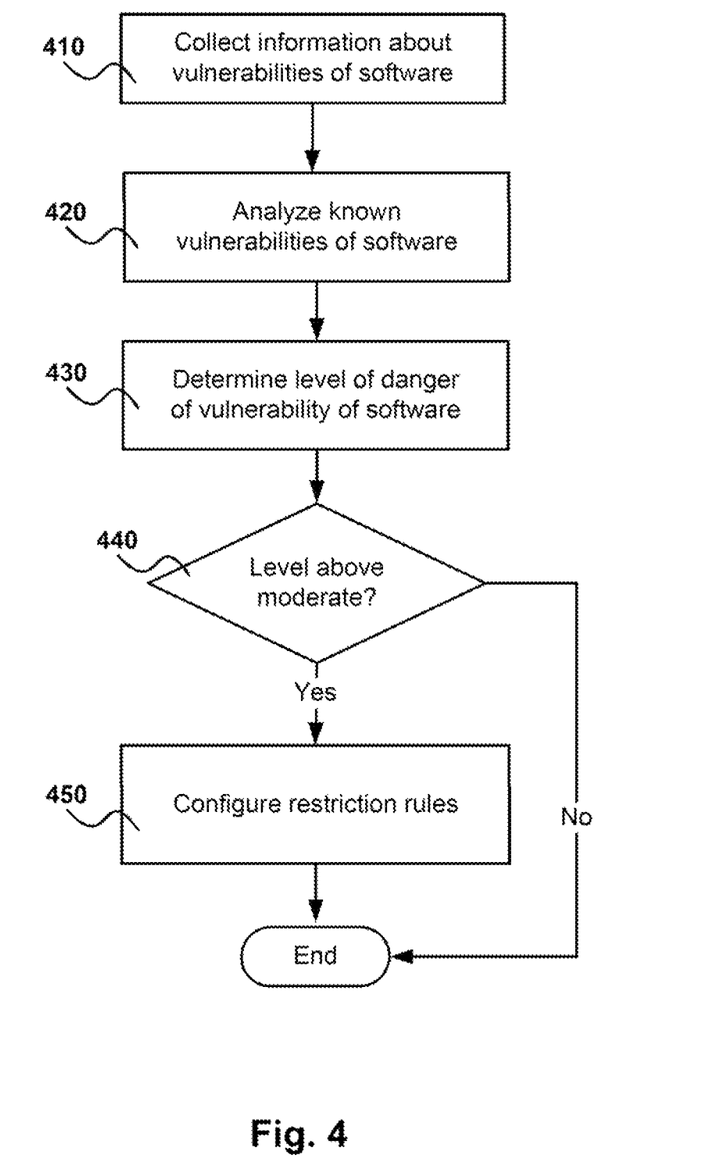
FIG. 4 is a flow diagram illustrating an example methodology for configuring restriction rules of the application control system in accordance with aspects of the invention.

FIG. 4 shows are example method for configuring restriction rules of the application control system. The configuring of the restriction rules involves fine-tuning the restriction rules that have been created or creating additional restriction rules aimed at restrictions of actions enabling the utilization of the specific vulnerability of the application being controlled. An example of such a restriction is the blocking of access to the network if the vulnerability in the application makes possible the downloading of some kind of malicious file from the network. Another example is restricting the use of any data library because the data library makes it possible to use a file containing a vulnerability. Furthermore, since the fine-tuning of the restriction rules involves an analysis of the specific vulnerabilities of the applications, it is advisable to determine the danger level of each vulnerability of the application.

Thus, in the step 410, the application analysis module 150 may collect information about each vulnerability of the application. It should be noted that information on the vulnerability of an application includes at least one of the following kinds of information: information on exploits utilizing this vulnerability; information on network ports and protocols used by the exploit; information on the presence of an update removing this vulnerability, and the time of detection of this vulnerability; information on the potential harm. Then, in step 420, the module 150 performs an analysis of the information gathered about each vulnerability of the application. The analysis consists in identifying actions which are performed during the utilization of the vulnerability of the application by the corresponding exploit, and then compiling a list of anomalous actions. Anomalous actions are actions performed during the utilization of the vulnerability of the application by the exploit. The analysis consists in emulating the application during the utilization of the analyzed vulnerability by the exploit.

After creating the list of anomalous actions, the module 150 in step 430 determines the danger level of the vulnerability. An example of the determining the danger level is described in greater detail in FIG. 2 above. Next, in step 440, it is determined whether the danger level corresponding to a vulnerability above a moderate level. For example, if the danger level was determined as being critical or significant, then the danger level is above moderate. Otherwise, if the danger level corresponds to the moderate or low level, then the danger level is considered below moderate. Furthermore, if the danger level is below moderate, then the vulnerability is not taken into account for creating additional restriction rules and the process is ended. But if the danger level is above moderate, the application analysis module 150 sends to the restriction rule formulation module 160 the created list of anomalous actions. In step 450, the restriction rule formulation module 160 creates at least one additional restriction rule based on the list of anomalous actions for restricting the actions during the execution of the application containing the corresponding vulnerability. It should be noted that the additional restriction rule based on the list of anomalous actions will forbid the application to perform the actions contained on this list. After this, the restriction rule formulation module 160 may add the created restriction rule to the restriction rule database 120 and end the process.

Figure 5:
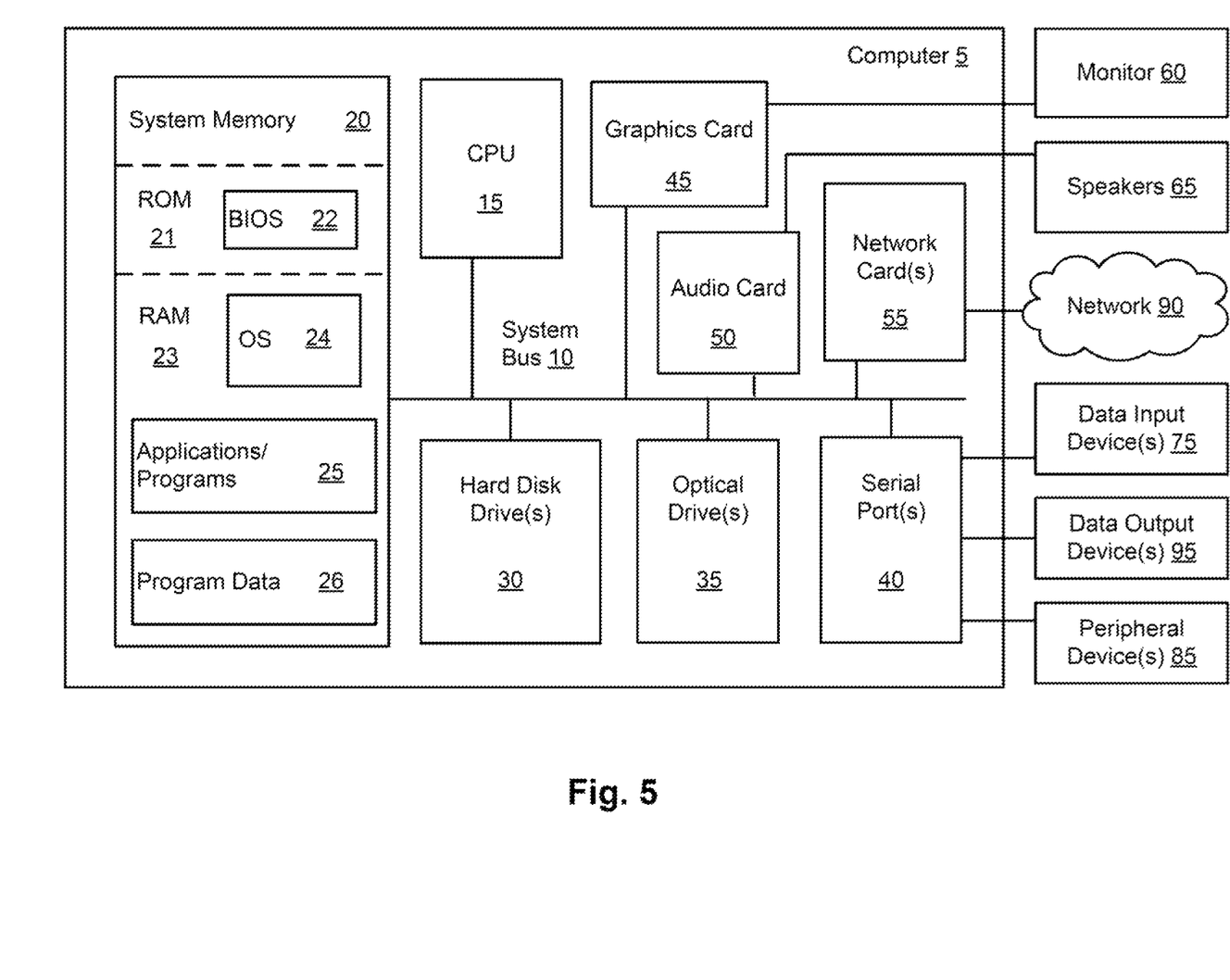
FIG. 5 is a diagram illustrating an example general-purpose computer system on which the application control system can be deployed in accordance with aspects of the invention.

FIG. 5 depicts an example configuration of a general-purpose computer 5 that can be used to implement the disclosed system and methods for protecting computer systems from software vulnerabilities according to various aspects of the invention. The computer system 5 may include, but not limited to, a personal computer (PC), a notebook, tablet computer, a smart phone, a network server, a router, or other type of computing device. As shown, computer system 5 may include one or more hardware processors 15, system memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Inter Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 95, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 90, such as the Internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein means a real-world device, component, or arrangement of components implemented using hardware, such as by an application specific integrated circuit (ASK) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general-purpose computer system (such as the one described in greater detail in FIG. 5 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known components referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for protecting a computer system from software vulnerabilities, the method comprising:

determining, by a hardware processor, whether an application includes one or more vulnerabilities affecting at least one of a security of the application, security of data used by the application, and security of an operating system of the computer system;
creating a definitive list of typical actions that includes a process of at least following three stages for protecting the computer system from software vulnerabilities:
in a first stage, generating a first list of typical actions performed by the application based on response information collected from a query sent to a plurality of external information sources, including at least a remote antivirus server, wherein if an action was not discovered from at least one of the plurality of external information sources, then the action is not added to the list of the first typical actions;
in a second stage, compiling a second list of typical actions by removing one or more actions of the application used by an exploit from the list of typical actions performed by the application, wherein said second list of typical actions is collected at least through an analysis during the execution of the application;
in a third stage, comparing the first and the second lists of the typical actions compiled in the first and second stages and compiling the definitive list of typical actions based on comparison of the first and the second lists of the typical actions;
configuring one or more restriction rules based on the definitive list of typical actions to eliminate the one or more vulnerabilities, wherein a restriction rule allows the application to perform typical actions and blocks anomalous actions; and
controlling the execution of the application using the restriction rules.

2. The method of claim 1, wherein determining whether the application has one or more vulnerabilities further includes:
determining whether the application belongs to a category of applications that have one or more known vulnerabilities.

3. The method of claim 1, wherein
the plurality of external information sources further include one or more of a database of a developer of the application, and one or more user computers running the application; and
said second list of typical actions is collected at least through emulation and analysis during the execution of the application a virtual environment.

4. The method of claim 1, wherein configuring one or more restriction rules based on the definitive list of typical actions further includes:
determining a danger level of the identified vulnerabilities of the application; and
creating additional restriction rules based on the danger level of the vulnerability.

5. The method of claim 1, further comprising:
installing one or more application updates or security patches to eliminate the identified vulnerability.

6. The method of claim 1, further comprising:
removing one or more restriction rules associated with an eliminated vulnerability upon detecting no known vulnerability associated with the application.

7. The method of claim 1, further comprising:
modifying the set of restriction rules by fine-tuning the restriction rules or creating additional restriction rules associated with the identified vulnerability upon detecting each remaining known vulnerability associated with the application having a defined danger level.

8. A system for protecting a computer system from software vulnerabilities, the system comprising:
a hardware processor configured to:
determine whether an application includes one or more vulnerabilities affecting at least one of a security of the application, security of data used by the application, and security of an operating system of the computer system;
create a definitive list of typical actions that includes a process of at least following three stages for protecting the computer system from software vulnerabilities:
in a first stage, generate a first list of typical actions performed by the application based on response information collected from a query sent to a plurality of external information sources, including at least a remote antivirus server, wherein if an action was not discovered from at least one of the plurality of external information sources, then the action is not added to the list of the first typical actions;
in a second stage, compile a second list of typical actions by removing one or more actions of the application used by an exploit from the list of typical actions performed by the application, wherein said second list of typical actions is collected at least through an analysis during the execution of the application;
in a third stage, compare the first and the second lists of the typical actions compiled in the first and second stages and compiling the definitive list of typical actions based on comparison of the first and the second lists of the typical actions;
configure one or more restriction rules based on the definitive list of typical actions to eliminate the one or more vulnerabilities, wherein a restriction rule allows the application to perform typical actions and blocks atypical and anomalous actions; and
control the execution of the application using the restriction rules.

9. The system of claim 8, wherein, to determine whether the application has one or more vulnerabilities, the processor is further configured to:
determine whether the application belongs to a category of applications that have one or more known vulnerabilities.

10. The system of claim 8, wherein
the plurality of external information sources further include one or more of a database of a developer of the application, and one or more user computers running the application; and
said second list of typical actions is collected at least through emulation and analysis during the execution of the application a virtual environment.

11. The system of claim 8, wherein, to configure one or more restriction rules based on the definitive list of typical actions the processor is further configured to:
determine a danger level of the identified vulnerabilities of the application; and
create additional restriction rules based on the danger level of the vulnerability.

12. The system of claim 8, wherein the processor is further configured to:
install one or more application updates or security patches to eliminate the identified vulnerability.

13. The system of claim 12, wherein the processor is further configured to:
remove one or more restriction rules associated with an eliminated vulnerability upon detecting no known vulnerability associated with the application.

14. A computer program product stored on a non-transitory computer-readable storage medium, the computer program product comprising computer-executable instructions for protecting a computer system from software vulnerabilities, including instructions for:

determining, by a hardware processor, whether an application includes one or more vulnerabilities affecting at least one of a security of the application, security of data used by the application, and security of an operating system of the computer system;

creating a definitive list of typical actions that includes a process of at least following three stages for protecting the computer system from software vulnerabilities:

in a first stage, generating a first list of typical actions performed by the application based on response information collected from a query sent to a plurality of external information sources, including at least a remote antivirus server, wherein if an action was not discovered from at least one of the plurality of external information sources, then the action is not added to the list of the first typical actions;

in a second stage, compiling a second list of typical actions by removing one or more actions of the application used by an exploit from the list of typical actions performed by the application, wherein said second list of typical actions is collected at least through an analysis during the execution of the application;

in a third stage, comparing the first and the second lists of the typical actions compiled in the first and second stages and compiling the definitive list of typical actions based on comparison of the first and the second lists of the typical actions;

configuring one or more restriction rules based on the definitive list of typical actions to eliminate the one or more vulnerabilities, wherein a restriction rule allows the application to perform typical actions and blocks anomalous actions; and     controlling the execution of the application using the restriction rules.

15. The product of claim 14, wherein determining whether the application has one or more vulnerabilities further includes:

determining whether the application belongs to a category of applications that have one or more known vulnerabilities.

16. The product of claim 14, wherein the plurality of external information sources further include one or more of a database of a developer of the application, and one or more user computers running the application; and     said second list of typical actions is collected at least through emulation and analysis during the execution of the application a virtual environment.

17. The product of claim 14, wherein configuring one or more restriction rules based on the definitive list of typical actions further includes:

determining a danger level of the identified vulnerabilities of the application; and     creating additional restriction rules based on the danger level of the vulnerability.

18. The product of claim 14, further comprising:

installing one or more application updates or security patches to eliminate the identified vulnerability.

19. The product of claim 14, further comprising:

removing one or more restriction rules associated with an eliminated vulnerability upon detecting no known vulnerability associated with the application.

\* \* \* \* \*